June 30, 1942. O. H. HUNT 2,288,528
DIRECTION INDICATOR AND SIGNAL
Filed Jan. 29, 1940
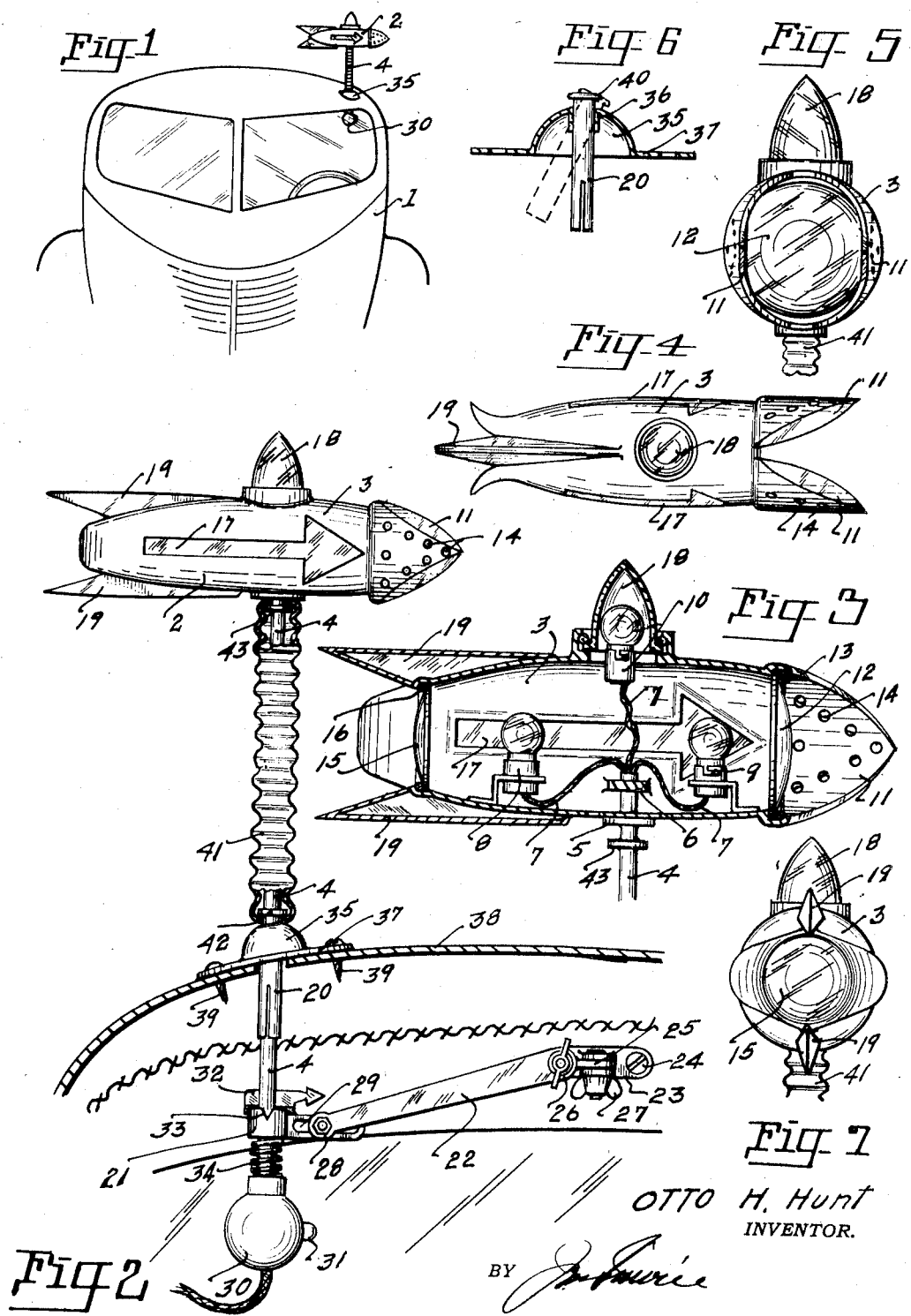
OTTO H. Hunt
INVENTOR.
BY
ATTORNEY.

Patented June 30, 1942

2,288,528

UNITED STATES PATENT OFFICE 2,288,528

DIRECTION INDICATOR AND SIGNAL

Otto H. Hunt, Salem, Oreg.

Application January 29, 1940, Serial No. 316,207

3 Claims. (Cl. 177—327)

This invention relates to direction indicators and signals and is particularly adapted to be used in connection with automobiles, trucks and busses.

The primary object of the invention is to provide a signal whose physical appearance will indicate direction, at the same time having illuminated indicating signals incorporated therein. The location of the signal is such that it can be readily seen by pedestrians or drivers of other vehicles from any and all directions.

In this new and improved signaling device it is possible to indicate the direction that the vehicle is intending to turn or the direction forward or backward that the vehicle is traveling. These directions are indicated, as stated before, from any location surrounding the vehicle.

A further object of the invention is to provide an indicating signal having all its working parts encased within suitable housing, protecting the working parts from weather conditions.

A still further object of the invention is to provide mechanical means for raising or lowering the signal vertically, so that the signal may be up where it may be observed readily from all directions, but can be lowered by the operator of the vehicle when so desired.

A further object of the invention is to provide mechanical construction for adapting the signal to any type of vehicle or location on the vehicle.

These and other incidental objects will be apparent in the drawing, specification and claims.

Referring to the drawing:

Figure 1 is a fragmentary diagrammatical view of a vehicle, having one of my new and improved signals mounted thereon indicating that a left turn is to be made.

Figure 2 is a fragmentary sectional view of the top of the vehicle, just behind the windshield, having my new and improved signal mounted thereon, parts broken away for convenience of illustration.

Figure 3 is a sectional view of the direction indicator, showing its internal construction.

Figure 4 is a plan view of the direction indicator.

Figure 5 is an end view of the indicator, looking into the forward end of the arrow indicator.

Figure 6 is a sectional detail view of the fixture for mounting the signal to the top of the vehicle.

Figure 7 is a rear end view of the signal.

In the drawing:

A motor vehicle is indicated at 1, having my new and improved direction indicator and signal 2 mounted thereon. The signal consists of a main barrel shaped body 3, mounted upon a vertical supporting stem 4. The stem 4 is fixedly secured to the body 3 at 5 and cross frame 6. This stem is hollow providing a conduit for the wiring 7 leading to the light globe fittings 8, 9 and 10. Extensions 11 extend forward of the signal and form shields or arrow indicators which appear like an arrow head from a physical standpoint.

A suitable lens 12 is mounted at the base of the arrow head, and has a suitable retaining ring 13 for mounting it in position. The light fitting 9 projects light through the lens 12, said lens being of a color that will have a definite indicating meaning, such as indicating that the vehicle is traveling forward when viewed at night, at the same time the light shows through the holes 14, of the extension 11, providing the outline of the arrow head from a side view. In the rear of the body of the signal is located a lens 15, which is maintained in position by the ring 16. The light mechanism 8 projects light through the lens 15 indicating that the vehicle is traveling away from a given point. Both light mechanisms 8 and 9 project light through the side arrows 17 indicating the direction of travel from a side view. The light mechanisms 8 and 9 are controlled from a switch within the vehicle and remain in a lighted condition when the headlights of the car are turned on or they may be controlled separately.

The stop signal is located within the cone shaped lens 18, and is illuminated by the light mechanism 10 in connection with the brake pedal of the vehicle, this stop signal can be readily observed from any direction. Tail pieces 19 are fixed to the rear of the signal and are for the purpose of carrying out the general design of the arrow sign.

Referring to Figure 2, the supporting stem 4 passes down through a tubular guide 20, thence through the guide or bracket 21, this guide bracket is maintained in a definite vertical position by the action of the pivotally mounted supporting arm 22. The arm 22 is pivotally mounted to the bracket 23, bracket 23 is fixed to the frame of the vehicle by suitable fastening means, as screws 24. The arm 22 may be rotated in a horizontal plane by the friction joint 25 and in a vertical plane by friction joint 26. This provides flexibility of positioning the supporting guide bracket 21 in line with the guide 20. After this position has been determined the joint 25 is securely locked by the adjustment nut 27, but the arm 22 is permitted, through friction at the joint 26, to be raised or lowered. A sliding friction joint 28 is provided at the outer end of the arm 22 working within the slot 29 of the guide 21. This slot compensates for radial movement of the arm 22 when the supporting stem 4 is raised and lowered in a vertical line by the operator.

The construction just described is rather important to my invention, as it provides vertical raising and lowering of the signal at the same time providing a guiding bracket assembly that can be readily adapted to any design of car.

A knob 30 is fixedly mounted to the supporting stem 4 and has a knob 31 fixed thereto to indicate the position of the signal relative to the vehicle. A key 32 works through a slot, not here shown, within the supporting stem, and is for the purpose of holding the signal in any set position by resting in the notches 33 of the guide 21. The spring 34 bears against the underside of the guide 21 and the upper end of the knob 30, causing tension downward on the shaft forcing the key 32 into the notches 33, holding the indicating arrow in any desired position.

Referring to Figure 6, I have provided a guide for guiding the supporting stem 4 through the top of the vehicle. This guide consists of a tube 20, fixedly mounted within the fitting 35 at 36. The fitting has a flange 37 for resting on the top 38 of the vehicle, this flange is secured to the top by suitable screws 39 and may have a sealing compound between the top and the flange for preventing any leaks. After the fitting 35 has been mounted to the top of the vehicle, the guide 20 may be bent to a vertical position thereby adapting itself to any type or shape of top. A flange 40 is provided on the top of the guide 20 and is for the purpose of maintaining the flexible covering 41 thereunder at 42. The upper end of the covering is maintained between the flange 43 and the flange 5 of the signal. This covering is provided for enclosing the working parts, protecting them from foreign matter.

In raising and lowering of the signal, the operator grasps the knob 30 and forces it up or down, this raises or lowers the stem 4 within the guide 20 and pivots the arm 22 up or down about its friction joint 26 permitting a vertical movement of the stem 4, maintaining the assembly in a more or less rigid condition.

Having described the mechanical construction of my new and improved direction indicator and signal, I will now describe its operation from a signaling standpoint.

When the vehicle is traveling away from a point the rear lens 15 indicates this fact, whether the car is going forward or backing up. When the vehicle is coming towards a given point, the lens 12 will indicate this fact, both going forward or backing up, for instance if the driver of the vehicle intends to back the vehicle up be would rotate the knob 30 so that the arrow pointed rearward, this would indicate by the lens 12 that he was going to back the vehicle. In case the vehicle were parallel to the curb and the driver intended to leave the curb, pulling into the line of traffic, the knob 30 would be revolved so that the indicator would point to the left or the direction in which he was to move the vehicle. In case of approaching an intersection and the driver desiring to transfer to the proper traffic lane to make a turn, the knob 30 would be revolved turning the indicator at right angles to the vehicle in the direction in which he intends to turn. This would indicate to traffic in the rear and to on-coming traffic that he was about to enter the proper lane, to make the turn and that he intended to make the indicated turn.

This signal would be visible from all directions, to both the pedestrians and the vehicles. The signal would remain in the indicated position until the turn had been made, or it would remain in this position if it were desired to circle an entire block. In case the driver of the vehicle wishes to stop, by simply operating the brake, the signal will indicate in all directions that he intends to stop from the lens 18 located above the signal.

Viewing an on-coming vehicle the forward lens 12, as the indicating signal in the direction of travel, would indicate that the vehicle intends or is coming straight ahead, therefore, if no change of direction is intended there is a signal means indicating that there is no change in direction to be made, so that through my system of signaling there is a double check on the intentions of the driver, whether he is going to make a change of direction or remain traveling in the same direction.

The transparent arrow 17, lens 12 and lens 15 may be of any suitable color to indicate the signal given, the color of these lens would be determined by laws that may be in effect.

I do not wish to be limited to the particular mechanical construction illustrated, as other forms of mechanical embodiment may be employed still coming within the scope of the claims to follow.

What is claimed as new is:

1. A direction signal for vehicles and the like including a barrel shaped body having a lens at each end, projections at the forward end of the body beyond the adjacent lens and arranged in spaced relation and simulating in side view the head of an arrow, spaced projections at the rear end of the body extending beyond the adjacent lens and simulating in end view the tail of an arrow, and a light source adjacent to each lens.

2. A construction as defined in claim 1 wherein the projections at the forward end of the body are formed with apertures to permit light passage.

3. A construction as defined in claim 1 wherein the sides of the body have transparent areas formed in the shape of an arrow and open to the illumination from the light source for either lens.

OTTO H. HUNT.